March 29, 1949.

J. D. SHEAROUSE 2,465,663

DEVICE FOR DETERMINING LENGTHS
OF TRUSS COMPONENTS

Filed June 18, 1948

INVENTOR.
JAMES D. SHEAROUSE
BY
McMorrow, Berman & Davidson
ATTORNEYS

March 29, 1949.   J. D. SHEAROUSE   2,465,663
DEVICE FOR DETERMINING LENGTHS
OF TRUSS COMPONENTS
Filed June 18, 1948   2 Sheets-Sheet 2
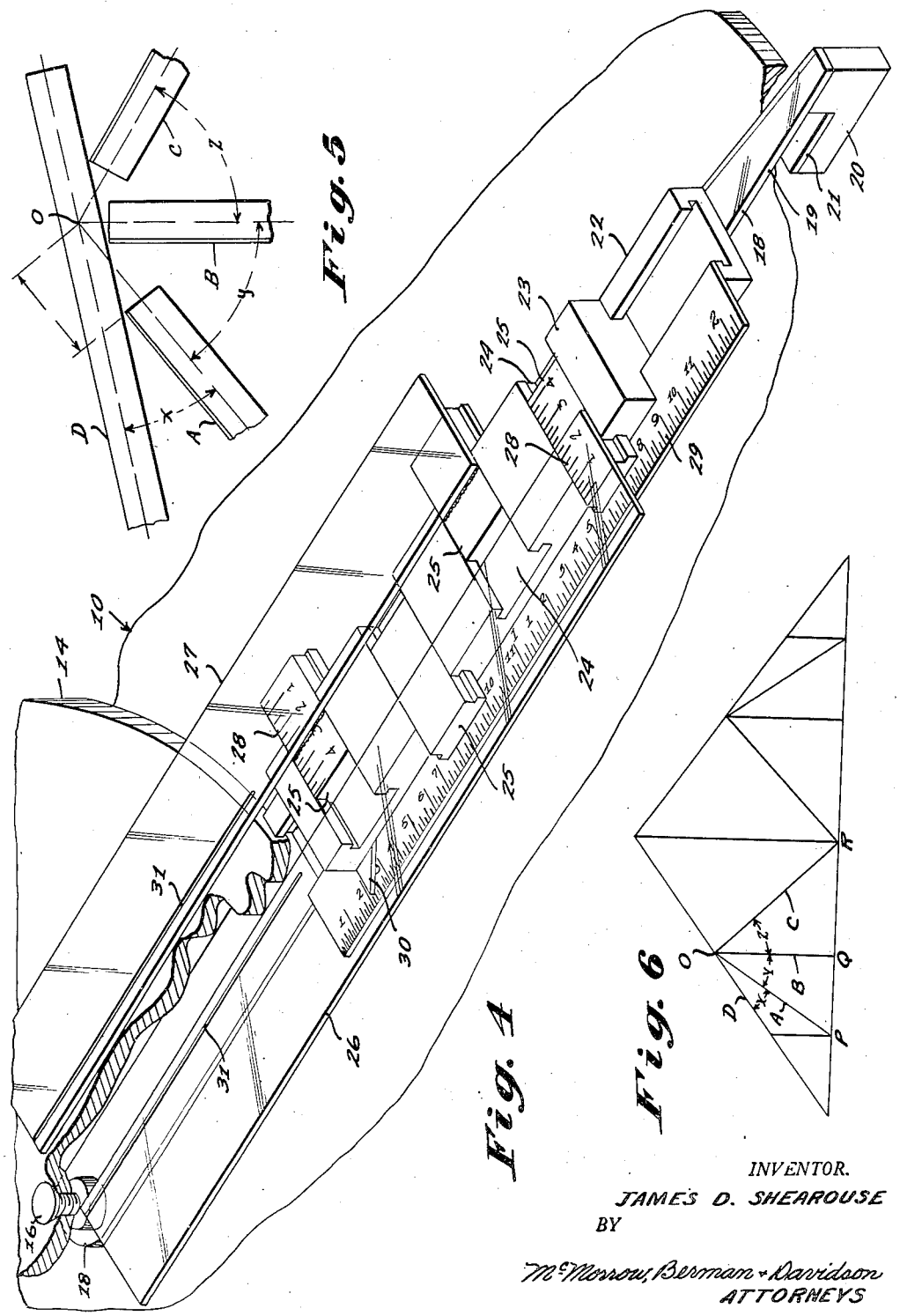
INVENTOR.
JAMES D. SHEAROUSE
BY
McMorrow, Berman + Davidson
ATTORNEYS Patented Mar. 29, 1949

2,465,663

UNITED STATES PATENT OFFICE 2,465,663

DEVICE FOR DETERMINING LENGTHS OF TRUSS COMPONENTS

James D. Shearouse, Norfolk, Va.

Application June 18, 1948, Serial No. 33,871

4 Claims. (Cl. 33—76)

This invention relates to improvements in measuring devices and more particularly to an improved device for measuring the lengths of structural components in a roof or bridge truss or similar fabricated structure.

It is among the objects of the invention to provide an improved measuring or calculating device having parts positionable to simulate the relative positions of the structural components of a truss, or similar structure, and scales for indicating the proper lengths of the structural components in a manner such that the actual lengths may be read off directly or obtained by a simple mathematical subtraction from a known or predetermined value without the necessity of laying out the entire structure in detail, and which device is simple and durable in construction, economical to manufacture and easy to operate and can be conveniently provided in scales that render the results given extremely accurate.

Other objects and advantages will become apparent from a consideration of the following description and the appended claims in conjunction with the accompanying drawings wherein:

Figure 4 is a perspective view of one of the arms constituting operative components of the device;

Figure 5 is a somewhat diagrammatic view of the portions of a group of structural components adjacent a structural joint; and Figure 6 is a diagrammatic view of a typical roof truss having structural components measurable by the device of the invention.

Figure 1:
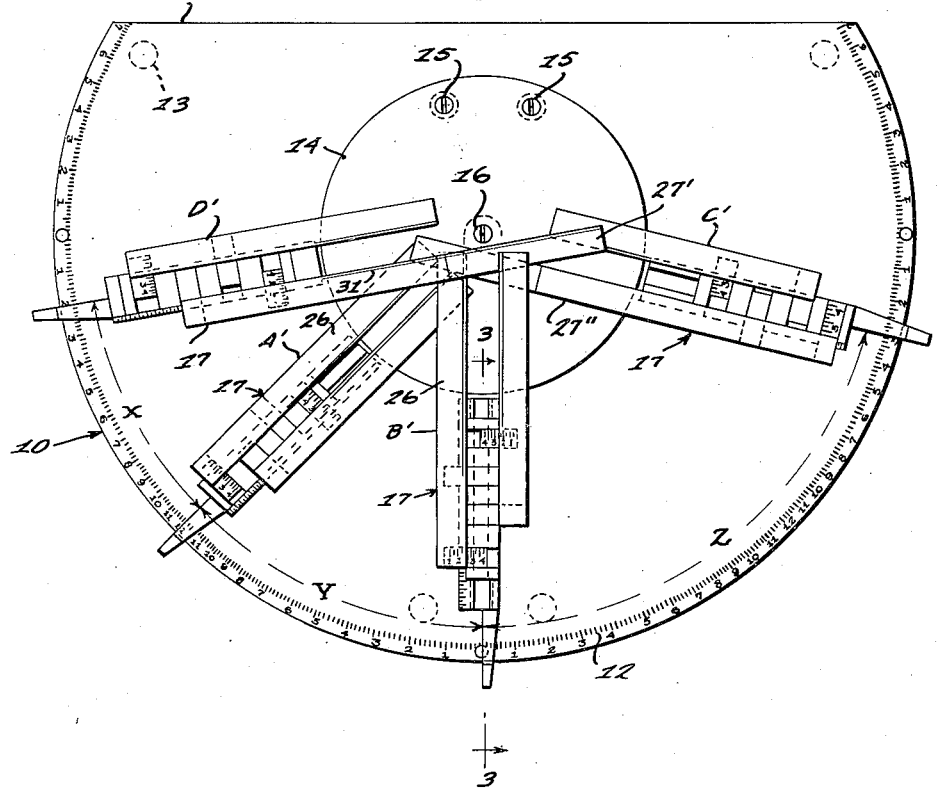
Figure 1 is a top plan view of a device illustrative of the invention.
Figure 2:
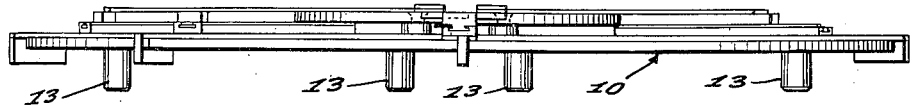
Figure 2 is an edge elevation of the device illustrated in Figure 1.

With continued reference to the drawings, the numeral 10 generally indicates a base plate of circular form. Where the device is made to a comparatively small scale the base plate 10 may be entirely circular and where made to a larger scale it may have a portion cut away along a cord-wise edge 11 to reduce the size and weight of the device. The base plate or disc 10 may be conveniently formed of any suitable material such as an opaque or translucent synthetic resin plastic and has a scale 12 extending around the periphery thereof. This scale 12 may be laid off in degrees starting from a predetermined zero point but is preferably, as illustrated, a scale of mathematical functions of various angles such as may be obtained from conventional slope tables such, for example, as "Smoley's Tables."

Base plate 10 is supported on a plurality of short, angularly spaced legs 13 and a circular disc 14 is secured thereon concentric therewith by suitable means such as the screws 15. Disc 14 provides a suitable reinforcement for the center pivot screw 16 to which the arms, generally indicated at 17, are pivotally connected at their inner ends and also provides, at its periphery, a guide for these arms during angular movement thereof about the pivot screw 16.

As all of the arms 17 are substantially identical in construction, a detailed description of one only is considered sufficient for the purposes of the present disclosure.

Figure 3:
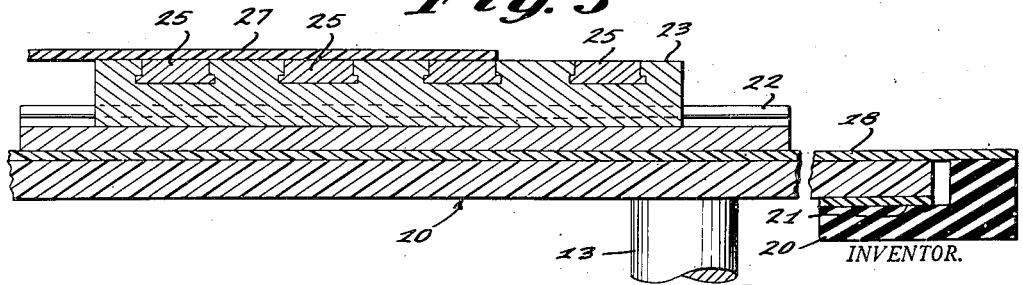
Figure 3 is a cross section on an enlarged scale and a fragmentary portion of the device, taken substantially on the line 3—3 of Figure 1.

Each arm 17, as particularly illustrated in Figures 3 and 4, comprises a flat strip 18 of thin material, such as synthetic resin plastic, having an apertured inner end through which the screw 16 extends and having its outer end provided with a straight, longitudinally extending edge 19 which provides a marker for aligning the arm with the selected marking of the scale 12. The inner portion of the strip 18 extends between the base plate 10 and the circular disc 14 and the outer end of the strip carries a recessed foot 20 which underlies the outer edge portion of base plate 10. This foot preferably is formed of resilient material or has a pad 21 of suitable resilient material thereon contacting the under surface of the base plate to frictionally hold the arm in adjusted angular position relative to the base plate. A longitudinal guide way 22 having a groove of T-shaped cross section opening to the upper surface thereof is mounted on the upper surface of strip 18 and extends from the periphery of disc 14 to a position adjacent the outer edge of plate 10. A longitudinal slide 23 is slidably mounted in the groove of longitudinal slideway 22 and is provided with four spaced apart, transverse slideways 24 each having a groove of T-shaped cross-sections opening to the upper surface of the longitudinal slide, and a plurality of transverse slides 25 are slidably mounted one in each transverse slideway 24. A straight edge 26 of suitable transparent material is secured to the transverse slide 25 nearest the outer ends of longitudinal slide 23 and to the transverse slide 24 second from the inner end of the longitudinal slide, and a similar straight edge 27 is secured to the transverse slide 25 nearest the inner end of the longitudinal slide 23 and to the transverse slide 25 second from the outer end of the longitudinal slide. These two straight edges 26 and 27 are maintained parallel to each other by the transverse slides 25 and extend from locations adjacent the outer end of longitudinal slide 23 to a location adjacent the pivot screw 16 when the longitudinal slide 23 is in its innermost position, as illustrated, with its inner end substantially against the periphery of circular disc 14. The two transverse slides nearest the ends of the longitudinal slide 23 are provided on their upper surfaces with scales 28 graduated to indicate the distances from the longitudinal center line to the corresponding longitudinal edges of a structural component under consideration and the longitudinal slideway 22 is provided with a scale 29 which extends for substantially the entire length thereof. Longitudinal slide 23 is provided at its inner end with a pointer 30 movable over scale 29 to indicate a measured dimension for a purpose which will presently appear. Each straight edge 26 and 27 is provided adjacent its inner edge with a line or score mark 31 which is spaced inwardly parallel to the inner edge of the corresponding straight edge a distance equal in scale to the recommended clearance provided at the adjacent ends of structural components at a structural joint.

In using the device a diagram of the structure, such as is illustrated in Figure 6, is first laid out and the distances between the joint centers and the slopes of the various lines are determined from suitable tables now available. This is a relatively simple and easy operation which can be quickly accomplished. The distances between the joint centers however does not give the actual lengths of the structural members extending between these centers as these members must be cut short in order to avoid interference with associated members, the ends of all of the members around a particular joint center being attached to a suitable gusset plate in a well known manner.

The device of the invention is particularly adapted to determine the amounts which must be subtracted from the distances between the joint centers to find the actual lengths of the structural components of the truss.

In order to provide a complete understanding of the operation of the device let it be assumed that the device is being used to obtain the amounts to be subtracted from the ends of the structural components A, B and C around the joint center O as illustrated in Figures 5 and 6. Having first determined the actual distances between the joint center O and the joint centers P, Q and R in Figure 6 and the slopes of the components A, B, C and D, four arms 19 on base plate 10 are so positioned by the scale 12 that they bear the same angular relationship to each other as do the components A, B, C and D around the joint center O of the truss. This is accomplished by placing the straight edges 19 of the arm strips 18 on scale designations corresponding to the values given in the slope table. Next the two straight edges 26 and 27 of each arm are positioned so that their inner edges correspond in scale to the opposite longitudinal edges of the corresponding structural member or to the width of such member. This is accomplished by the scales 28 on the two transverse slides 25 to which the straight edges are respectively attached.

Where one of the structural members continues through the joint the arm corresponding to this member is provided with an elongated straight edge on its inner side, as indicated at 27' and 27'' in Figure 1. In the problem chosen for this illustration arm 27' is used. Arm 27'' would be similarly employed in a problem in which the member continuing through the joint must be represented by arm C' instead of arm D'. After the straight edges have all been properly positioned so that the respectively attached scales indicate the distances from the longitudinal center lines to the corresponding longitudinal edge of the simulated structural components the longitudinal slides 23 are moved in the longitudinal slideways 22 until the inner ends of no pair of straight edges extend beyond the clearance line 31 of any other straight edge. This condition is clearly illustrated in Figure 1 wherein the longitudinal slides of the two arms A' and B' simulating the two structural components A and B have been moved until the inner corners of the left hand straight edges 26 of these two arms are on the clearance line 31 of the lower straight edge 27 of the arm B' simulating the component B. In this view the arm C' simulating the component C has been moved until the inner corner of the right hand straight edge 26 of this arm is on the clearance line 31 of the lower straight edge 27' simulating the component B. The line across the left hand straight edge represents the end of the component C as this component in this problem does not continue through the joint. A similar line across straight edge 27' on the arm D' would indicate the end of the component arm D' represented if such a component did not continue through the joint. With the straight edges of the arms A', B' and C' in proper position the relative position of the respective pointers 30 on the scale 29 is noted and the distance indicated on the scale is then subtracted from the known distance between the joint centers O and P and O and Q. The same process is then repeated at centers P and Q and when these distances are subtracted from the known distances between the corresponding joint centers the exact length of the structural components A and B are known.

By this improved device the exact lengths of the structural components of a fabricated structure such as a roof or bridge truss can be quickly and easily determined without the necessity of laying out the complete truss in detail and the resulting values of the length of the different components will then be noted on a diagrammatic illustration of the structure, such as illustrated in Figure 6, for use of the persons actually fabricating the structure.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A measuring device for indicating the difference between the lengths of actual components of a fabricated structure and the theoretical lengths of such components comprising a circular base plate having graduations around the edge thereof, a circular disc concentric with said plate and secured thereto, and a plurality of arms each pivotally secured at one end to the center of said plate and movable at its opposite end around the periphery of said plate, said arms being movable to relative angular positions simulating the relative angular positions of the components of a fabricated structure about a selected structural joint center, each of said arms comprising a longitudinally extending slideway, a longitudinal slide movable in said slideway and having transverse slideways therein, transverse slides movable in said transverse slideways, a pair of parallel straight edges secured to said transverse slides and movable toward and away from each other to simulate by the space therebetween the width and position of the corresponding structural component, scales on said transverse slides for indicating the proper positions of said straight edges for a structural component of known width, a scale on said longitudinal slideway, and a pointer on said longitudinal slide movable over said last mentioned scale to indicate the distance from the center of said joint to the end of the structural component when the inner ends of said straight edges simulate the proper position of the corresponding end of the particular structural component.

2. A measuring device for indicating the difference between the lengths of the actual components of a fabricated structure and the theoretical lengths of such components comprising a substantially circular plate and a plurality of radial arms pivotally connected to said plate at the center of curvature thereof, said arms being movable at their outer ends around the arcuate periphery of said plate to simulate the relative angular positions of respective structural components about the center of a structural joint, each of said arms having movable means thereon to simulate the positions of the longitudinal edges of the corresponding structural component and the position of the end of such component when positioned clear of associated components, and relatively movable means thereon indicating the distance of the end of the corresponding structural component from the center of said structural joint.

3. A measuring device for determining the lengths of the components of a fabricated structure comprising a plate having at least a partly circular periphery, arms pivoted to said plate at the center of curvature of said partly circular periphery, said arms having their outer ends movable along the arcuate portion of the periphery of said plate to position said arms at relative angular positions corresponding to the relative angular positions of structural components about the center of a structural joint, means on each of said arms adjustable to represent the longitudinal edges and joint associated ends of the corresponding structural components, means on said arms for moving said component representing means longitudinally of said arms to position the represented ends of said components in a condition of mutual clearance about the joint, and means on said arm indicating the distance of the represented ends of the structural components from the joint center.

4. A measuring device for determining the lengths of the components of a fabricated structure comprising a plate having a center representative of the center of a structural joint and having at least a partly circular peripheral portion the curvature of which is centered on said represenative joint center and bearing a slope scale, and arm on said plate pivoted at their inner ends to said plate at said center with their outer ends movable over said scale to positions representing the relative angular positions of structural components about the center of a structural joint, means on each arm adjustable to represent the width and the position of the joint associated end of the corresponding structural component, means on each arm for moving said component representing means until the represented end of the corresponding component is properly positioned relative to the other components at said joint, and means on each arm indicating the distance of the represented end of the corresponding component from the joint center.

JAMES D. SHEAROUSE.

No references cited.